Feb. 26, 1929.
E. L. PARKER
1,703,453
CAKE HOLDER AND COOLER
Filed March 29, 1928
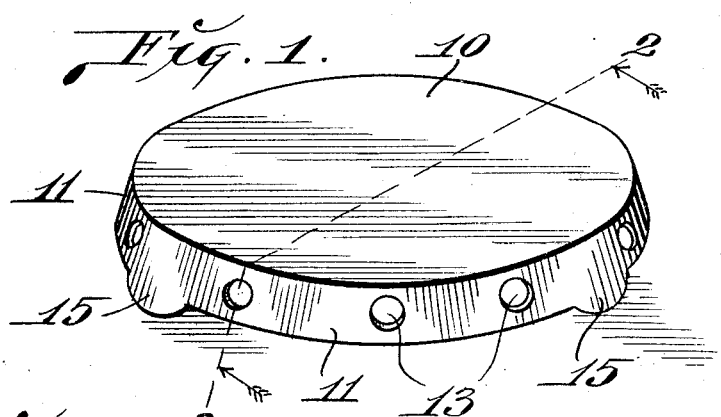
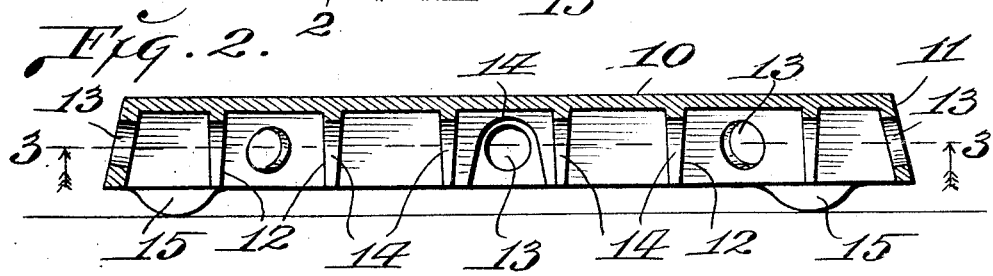
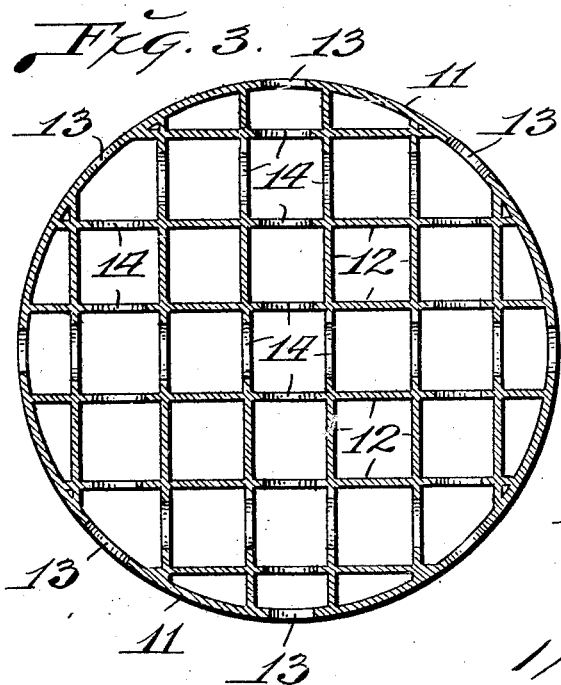
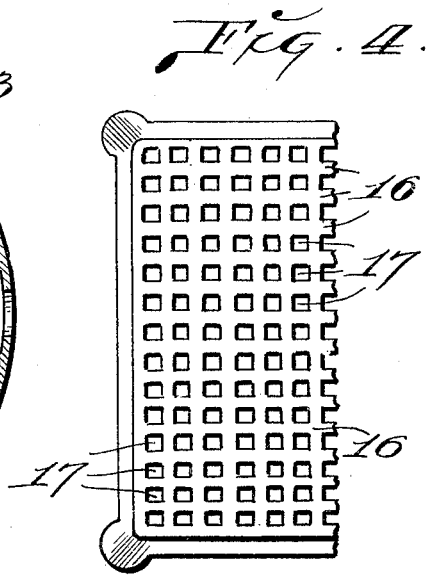
INVENTOR:—
ERIE L. PARKER,
By Martin P. Smith, Atty.

Patented Feb. 26, 1929.

1,703,453

UNITED STATES PATENT OFFICE.

ERIE L. PARKER, OF LOS ANGELES, CALIFORNIA.

CAKE HOLDER AND COOLER.

Application filed March 29, 1928. Serial No. 265,579.

My invention relates to a cake holder and cooler and has for its principal object, the provision of a relatively simple, practical and inexpensive device that may be advantageously employed as a holder or support for cakes, pies and like pastry, and which device will be effective in bringing about a comparatively rapid cooling of the lower portion of the cake or other pastry, and preventing the same from sweating and becoming soggy.

Further objects of my invention are to generally improve upon and simplify the construction of the existing forms of cake holders and coolers, to provide a device of the character referred to that may be easily and cheaply manufactured, and further, to provide a cake holder and cooler that is provided on its underside with a series of reinforcing ribs, certain of which are perforated or notched in order to form ducts or chambers thru which air may freely circulate in order to effect a comparatively rapid dissemination of the heat from a cake or the like that is placed on the holder.

With the foregoing and other objects in view, my invention consists in certain novel features of construction and arrangement of parts that will hereinafter be more fully described and claimed and illustrated in the accompanying drawings, in which—

Fig. 1 is a perspective view of a cake holder and cooler constructed in accordance with my invention.

Fig. 2 is an enlarged cross section taken approximately on the line 2—2 of Fig. 1.

Fig. 3 is a horizontal section taken on the line 3—3 of Fig. 2 and looking upwardly against the underside of the top plate and holder.

Fig. 4 is a plan view of a modified form of the holder and cooler.

Referring by numerals to the accompanying drawings which illustrate a practical embodiment of my invention, 10 designates the top plate of my improved holder and cooler, said plate being preferably formed of aluminum or a composition metal having a predominant portion of aluminum, and formed integral with and depending from the margin of the plate 10, is a flange 11. The top of the plate 10 is made perfectly flat and smooth.

Formed integral with the underside plate 10 and with the depending marginal flange 11, are intersecting ribs or flanges 12, the same being spaced equal distances apart and one set of said flanges being located at right angles to the set, thereby producing on the underside of the plate, a checker-work arrangement of flanges.

Formed thru the depending marginal flange and suitably spaced apart, are apertures 13, and those portions of the depending flanges 12 between each oppositely arranged pair of apertures 13 or notched or cut away as designated by 14, thus forming on the underside of the plate, a plurality of intersecting air ducts, the ends of which communicate with the corresponding openings 13, so as to permit the free circulation of air throughout the underside of the holder in order to effect a compartively rapid dissemination of heat when a cake or the like is taken directly from the oven and placed on the holder.

Formed integral with the lower edge of the marginal flange 11 are the three or more lugs 15 which function as feet or short legs that support the holder a short distance above the surface on which it rests.

In the use of my improved cake holder and cooler, a cake, pie or the like, when removed from the oven is placed on the plate 10 and as the latter absorbs heat from the cake or pie, the air within the connected chambers between the flanges 12, expands as it becomes heated and the heated air passes outwardly thru the openings 13 in the depending flange, and this air is replaced by cooler air that passes into the connected chambers beneath the lower edge of the flange 11, and such action is effective in bringing about a comparatively rapid cooling of the lower portion of the cake or other pastry placed on the holder, with the result that the lower portion of the body of the cake, or the portion that contacts with the plate 10 will cool rapidly without sweating or becoming soggy.

In tests and experiments, I have demonstrated the fact that a plate formed of aluminum produces excellent results in cooling pastry without producing the objectionable sweating, and this desirable effect is greatly enhanced by providing on the underside of the plate, a series of intersecting flanges in which are formed connected air circulation ducts. The holders may be made round, square or polygonal in form and they may be made in various sizes for the accommodation of different forms and sizes of cake, pastry and the like.

In Fig. 4, I have illustrated a modified form of the holder and cooler, and in this form, the top plate 16 which is formed of aluminum or like metal, is provided with a series of relatively small perforations 17 thru which air may freely circulate in order to bring about the cooling of the pastry placed on the plate.

A cake holder and cooler of my improved construction is relatively simple, may be easily and cheaply produced and is very effective in performing the functions for which it is intended.

It will be understood that minor changes in the size, form and construction of the various parts of my improved cake holder and cooler may be made and substituted for those herein shown and described without departing from the spirit of my invention, the scope of which is set forth in the appended claims.

I claim as my invention:

1. A cake holder and cooler comprising a plate, a marginal flange formed integral with and depending therefrom, said flange being provided with openings, a series of intersecting flanges formed integral with the underside of said plate and the marginal flange, and which flanges are provided with openings that form a series of connected air circulation ducts.

2. A cake holder and cooler comprising a plate, a marginal flange formed integral with and depending therefrom, said flange being provided with openings, a series of intersecting flanges formed integral with the underside of said plate and the marginal flange, and which flanges are provided with openings that form a series of connected air circulation ducts, the ends of which communicate with the openings in the depending marginal flange.

3. A cake holder and cooler comprising an aluminum plate having smooth, flat, upper surface, a marginal flange formed integral with and depending from said plate, lugs depending from the lower edge of said flange, two sets of flanges formed integral with the underside of said plate and said marginal flange, one set of flanges being arranged at right angles to the other set, there being openings formed in said flanges to provide a series of connected air circulation ducts and the ends of which ducts communicate with the openings in the depending marginal flange.

In testimony whereof I affix my signature.

ERIE L. PARKER.